US009898739B2

(12) United States Patent
Monastyrsky et al.

(10) Patent No.: US 9,898,739 B2
(45) Date of Patent: Feb. 20, 2018

(54) SYSTEM AND METHOD FOR ENSURING SAFETY OF ONLINE TRANSACTIONS

(71) Applicant: Kaspersky Lab ZAO, Mosow (RU)

(72) Inventors: Alexey V. Monastyrsky, Moscow (RU); Sergey Y. Golovanov, Moscow (RU); Vladislav V. Martynenko, Moscow (RU); Vyacheslav E. Rusakov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 0 days.

(21) Appl. No.: 14/166,496

(22) Filed: Jan. 28, 2014

(65) Prior Publication Data
US 2015/0088733 A1    Mar. 26, 2015

(30) Foreign Application Priority Data

Sep. 26, 2013    (RU) .................. 2013143484

(51) Int. Cl.
G06F 21/10     (2013.01)
G06Q 20/38     (2012.01)
H04L 29/06     (2006.01)
G06Q 20/40     (2012.01)

(52) U.S. Cl.
CPC .......... G06Q 20/382 (2013.01); G06F 21/10 (2013.01); G06Q 20/4016 (2013.01); H04L 63/1433 (2013.01)

(58) Field of Classification Search
CPC ...................................... G06F 21/10
USPC ........................................... 726/27
See application file for complete search history.

(56) References Cited

U.S. PATENT DOCUMENTS

| 7,509,679 | B2 | 3/2009 | Alagna et al. |
| 7,530,106 | B1* | 5/2009 | Zaitsev et al. .................. 726/24 |
| 7,735,116 | B1* | 6/2010 | Gauvin ................ G06F 21/552 |
| | | | 713/153 |
| 8,156,552 | B2 | 4/2012 | Alagna et al. |

(Continued)

FOREIGN PATENT DOCUMENTS

| EA | 200900225 | 12/2009 |
| RU | 2007138849 | 4/2009 |
| WO | WO2009032187 | 3/2009 |

OTHER PUBLICATIONS

"Malware and Module: definitions", Microsoft Dictionary 5th edition, 2002.*

(Continued)

Primary Examiner — Robert R Niquette
Assistant Examiner — William J Jacob
(74) Attorney, Agent, or Firm — Patterson Thuente Pedersen, P.A.

(57) ABSTRACT

Online transaction security is improved by detecting a start of an online financial transaction between a user-controlled online transaction application and a remote payment service. A protected data input module, a protected environment module, and a safe data transfer module each provides a corresponding set of protection operations. A risk level of conducting the financial transaction is assessed based on a vulnerability assessment and on present condition of the local computing system. An initial degree of protection for each of the modules is set, and subsequently adjusted based on the risk level.

23 Claims, 7 Drawing Sheets

(56) References Cited

U.S. PATENT DOCUMENTS

| | | | |
|---|---|---|---|
| 8,181,253 B1* | 5/2012 | Zaitsev | G06F 21/552 713/152 |
| 8,447,674 B2 | 5/2013 | Choudhuri et al. | |
| 8,646,084 B1* | 2/2014 | Pavlyushchik et al. | 726/24 |
| 8,918,865 B2* | 12/2014 | Freericks | G06F 21/54 726/22 |
| 8,955,107 B2* | 2/2015 | Eyada | H04L 63/0263 726/1 |
| 9,009,084 B2* | 4/2015 | Brandt | H04L 63/1408 706/12 |
| 2004/0187023 A1* | 9/2004 | Alagna et al. | 713/200 |
| 2005/0257266 A1* | 11/2005 | Cook | G06F 8/61 726/23 |
| 2007/0180509 A1* | 8/2007 | Swartz | G06F 9/4406 726/9 |
| 2007/0226807 A1* | 9/2007 | Ginter et al. | 726/27 |
| 2007/0234061 A1 | 10/2007 | Teo | |
| 2008/0016339 A1 | 1/2008 | Shukla | |
| 2008/0229415 A1* | 9/2008 | Kapoor | G06F 21/55 726/22 |
| 2008/0288405 A1* | 11/2008 | John | 705/44 |
| 2008/0301051 A1 | 12/2008 | Stahlberg | |
| 2009/0187991 A1 | 7/2009 | Freericks et al. | |
| 2011/0131123 A1* | 6/2011 | Griffin et al. | 705/35 |
| 2011/0238855 A1* | 9/2011 | Korsunsky | G06F 21/55 709/231 |
| 2011/0307374 A1* | 12/2011 | Grundner et al. | 705/39 |
| 2012/0109821 A1 | 5/2012 | Barbour et al. | |
| 2012/0203698 A1 | 8/2012 | Duncan et al. | |
| 2012/0259753 A1* | 10/2012 | Orad et al. | 705/35 |
| 2012/0317018 A1* | 12/2012 | Barnett | 705/39 |
| 2013/0024376 A1* | 1/2013 | Choudhuri et al. | 705/44 |
| 2013/0031000 A1* | 1/2013 | Morris | 705/44 |
| 2013/0268357 A1 | 10/2013 | Heath | |
| 2013/0298192 A1* | 11/2013 | Kumar | G06F 21/52 726/3 |
| 2015/0033305 A1* | 1/2015 | Shear | G06F 21/45 726/6 |

OTHER PUBLICATIONS

Sang H. Son et al. "An Adaptable Security Manager for Real-Time Transactions," Euromicro RTS 2000, 12th Euromicro Conference, 2000.*

Anti-Screen Logger Module. *Zemana*. 2 pages. Jan. 15, 2013.

Staying Safe from Virtual Robbers. Securelist. 17 pages. Sep. 12, 2013.

European Search Report for European Application No. EP14159070 dated Jan. 21, 2015.

Russian Search Report dated Feb. 11, 2015 for Russian Application No. 2013143484/08. English Translation not provided.

European Examination Report for European Application No. 14159070.3 dated Feb. 15, 2016.

* cited by examiner

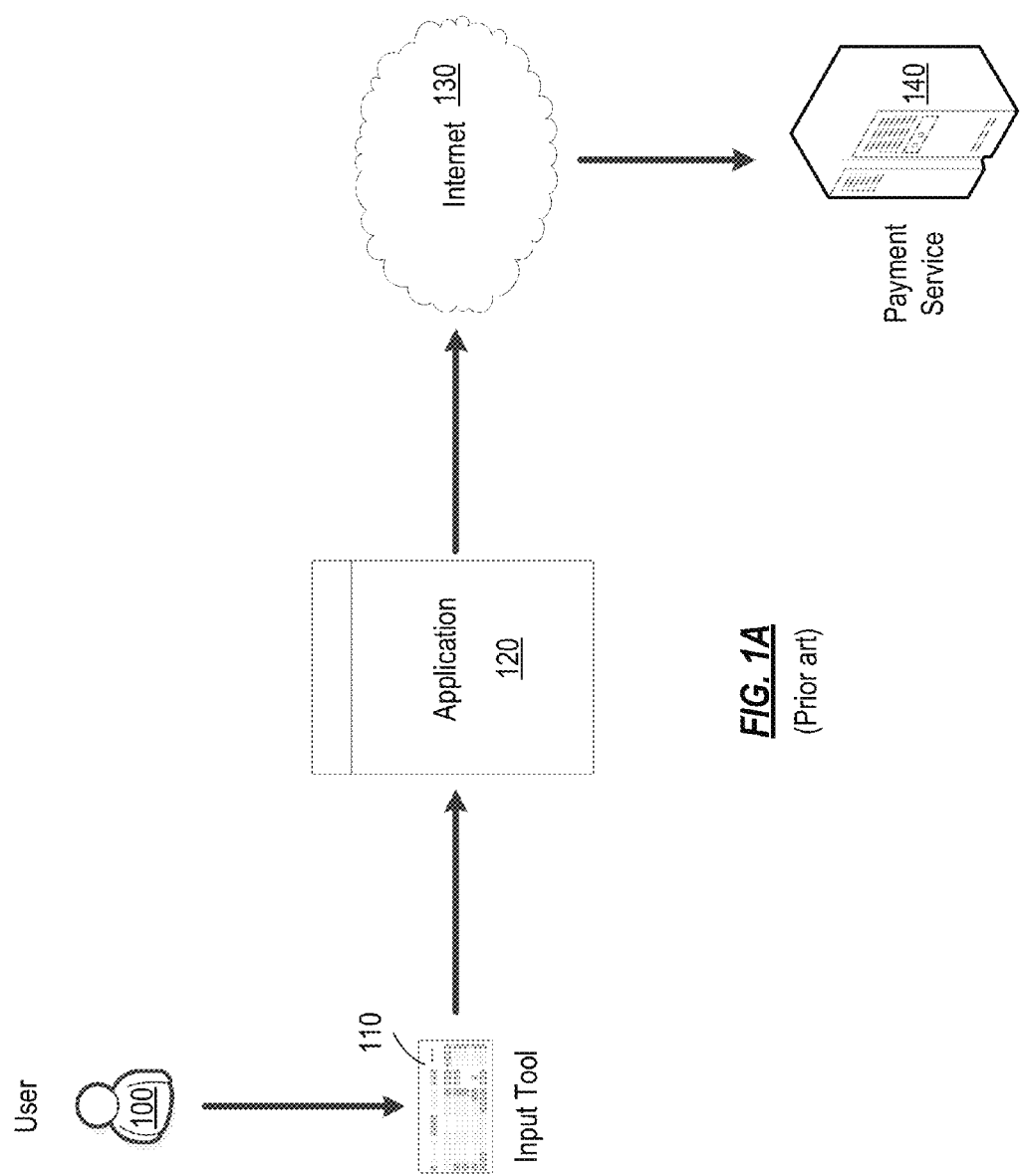

SYSTEM AND METHOD FOR ENSURING SAFETY OF ONLINE TRANSACTIONS

PRIOR APPLICATION

This application claims the benefit of Russian Federation Patent Application No. 2013143484 filed Sep. 26, 2013, incorporated by reference herein.

FIELD OF THE INVENTION

The invention relates generally to information processing and communications technologies and, more particularly, to computer-based technologies for conducting electronic commerce, banking, and other online transactions.

BACKGROUND OF THE INVENTION

Today, there is a wide variety of software which allows users to conduct various online transactions. Many transactions are made using online banking services accessible with standard Web browsers. Dedicated banking client applications are also used, which are especially popular on mobile platforms. Other applications related to online transactions include electronic currency systems, such as BitCoin, or online games that use their own system of micro-transactions, where the user can buy intra-game items or intra-game currency for real funds, for example, using a bank card.

Not surprisingly, with the growth of online payments, this service segment has attracted the interest of criminals who actively research ways for intercepting such transactions to carry out illegal transfers of funds. Usually, such data are stolen using malicious programs, i.e., malware, that are transferred to user computers by way of infection (e.g., infection vectors can include viruses, Trojans, worms, etc.). Most often, malware programs are transferred to computers through infection of popular web browsers.

The malware can then intercept data entered from input devices (such as a keyboard or a mouse), or intercept data sent to the network. For example, malware infecting browsers gains access to browser's files, and views the browsing history and saved passwords when web pages are visited. Data input interceptors (or keyloggers) intercept the input of data from a keyboard or a mouse, make screenshots and hide their presence in the system using a number of rootkit technologies. Such technologies are also used during realization of network packet interceptors (traffic sniffers), which intercept the network packets being transferred, extracting valuable information from them, such as passwords and other personal data. It should be noted that infection happens most often using vulnerabilities in software, which inadvertently allow various exploits to penetrate the computer system.

Existing antivirus technologies, such as signature-based or heuristic checks, proactive protection methods, or the use of trusted application lists (i.e., whitelists), can detect many malicious programs on user computers. However, these existing technologies are not always able to determine new malware variants, which are deployed with increasing frequency every day. Therefore, solutions are needed to make online transactions safer for users.

There are various solutions aimed at ensuring safety of online transactions. One approach for countering malicious programs that intercept data input from input devices involves using protected input devices. Examples of such devices include a keyboard that encodes entered data or a virtual (software-based) keyboard that accepts input through a graphical user interface using a different input device such as a mouse or touchscreen. Such solutions have a number of drawbacks: for a keyboard with encoding of entered data, interceptors can also be used that would intercept data before the encoding or after decoding, while a virtual keyboard can be compromised by using malicious programs that make screenshots with preset time intervals, thereby revealing the keys being pressed.

U.S. Patent Application Publication No. 2006/0136332 discloses the use of a combination of "protected transaction support device plus a program client on a computer" to ensure transaction safety. The client program operates transparently for the user. The protected device contains a set of algorithms ensuring the safety of each known transaction type. However, the application does not address the matter of analysis of the safety of the computer as a whole, i.e. in the presence of unknown malicious programs, data input by the user may be compromised. International Publication No. WO/2005033943 discloses a service for the analysis of the web server of a payment system for vulnerabilities (for example, presence of open ports). The visitors to the web server (i.e. the service's clients) will be shown information on the detected vulnerabilities, but the subsequent actions must be taken by the users themselves. U.S. Pat. No. 8,024,790 discloses a mechanism for determining that a URL address is important in terms of information input by the user, in order to take further steps to ensure safety; this may be impossible in case if the address has been compromised (a phishing site) or was not marked by the user as important.

Although each these approaches proposes addresses one, or some, of the susceptibilities of online transactions, each one leaves certain problems un-addressed. Another challenge has to do with burdening the user's experience with stacked-on protections. Particularly, adding individual protections tends to take up computing resources and slow down the process by which the user inputs data and otherwise interacts with the local computer system. Simply enabling multiple different protection mechanisms whenever a user appears to initiate an online transaction risks burdening the user to such an extent that the user may disable the protection software altogether. This paradoxically achieves the exact opposite result to the desired objective of ensuring security in these types of transactions. A practical solution is therefore needed.

SUMMARY OF THE INVENTION

According to one aspect of the invention, system for securing online transactions includes computing hardware, including a processor, data storage, and input/output devices including a network interface device and a graphical user interface. An operating system is stored in a non-transitory storage medium and executable on the computing hardware. Transaction protection instructions are executable on the computing hardware and stored in a non-transitory storage medium that, when executed, cause the computing hardware to implement a set of modules, which include the following.

A control module is configured to detect a start of an online financial transaction between a user-controlled online transaction application executing on the computing hardware and a remote payment service. A protected data input module configured to apply a selected degree of protection to limit access by unauthorized processes to an input sequence via at least one of the input/output devices while permitting the input sequence to be accepted by an authorized process. A protected environment module is configured apply a selected degree of protection of the user-controlled online transaction application from being compromised by malware. A safe data transfer module is configured to apply a selected degree of protection to determine whether a connection with the remote payment service is a correct connection with a reputable party. A vulnerability assessment module is configured to assess a risk level of conducting the financial transaction based on a vulnerability assessment and a present condition of the computing system. In some embodiments, a user response module is provided to assess user preferences based on responses taken by the user of the computing system corresponding to operation of at least one of the protected data input module, the protected environment module, and the safe data transfer module.

The control module is further configured to set an initial degree of protection for each of the protected data input module, the protected environment module, and the safe data transfer module based on the risk level; and adjust a degree of protection for at least one of the protected data input module, the protected environment module, and the safe data transfer module based on the risk level to a different degree of protection than the initial degree of protection for each of the at least one corresponding modules.

A related aspect of the invention is directed to a method for securing online transactions by a computing system. The method includes detecting a start of an online financial transaction between a user-controlled online transaction application executing on the computing system and a remote payment service, executing a protected data input module configured to apply a selected degree of protection to limit access by unauthorized processes to an input sequence via at least one of the input/output devices while permitting the input sequence to be accepted by an authorized process, executing a protected environment module configured apply a selected degree of protection of the user-controlled online transaction application from being compromised by malware, executing a safe data transfer module configured to apply a selected degree of protection to determine whether a connection with the remote payment service is a correct connection with a reputable party, assessing a risk level of conducting the financial transaction based on a vulnerability assessment and on present condition of the computing system, setting an initial degree of protection for each of the protected data input module, the protected environment module, and the safe data transfer module based on the risk level, and adjusting a degree of protection for at least one of the protected data input module, the protected environment module, and the safe data transfer module based on the risk level to a different degree of protection than the initial degree of protection for each of the at least one corresponding modules.

BRIEF DESCRIPTION OF THE DRAWINGS

The invention may be more completely understood in consideration of the following detailed description of various embodiments of the invention in connection with the accompanying drawings, in which:

FIG. 1A is a diagram illustrating a typical arrangement for conducting online transactions.

Figure 1B:
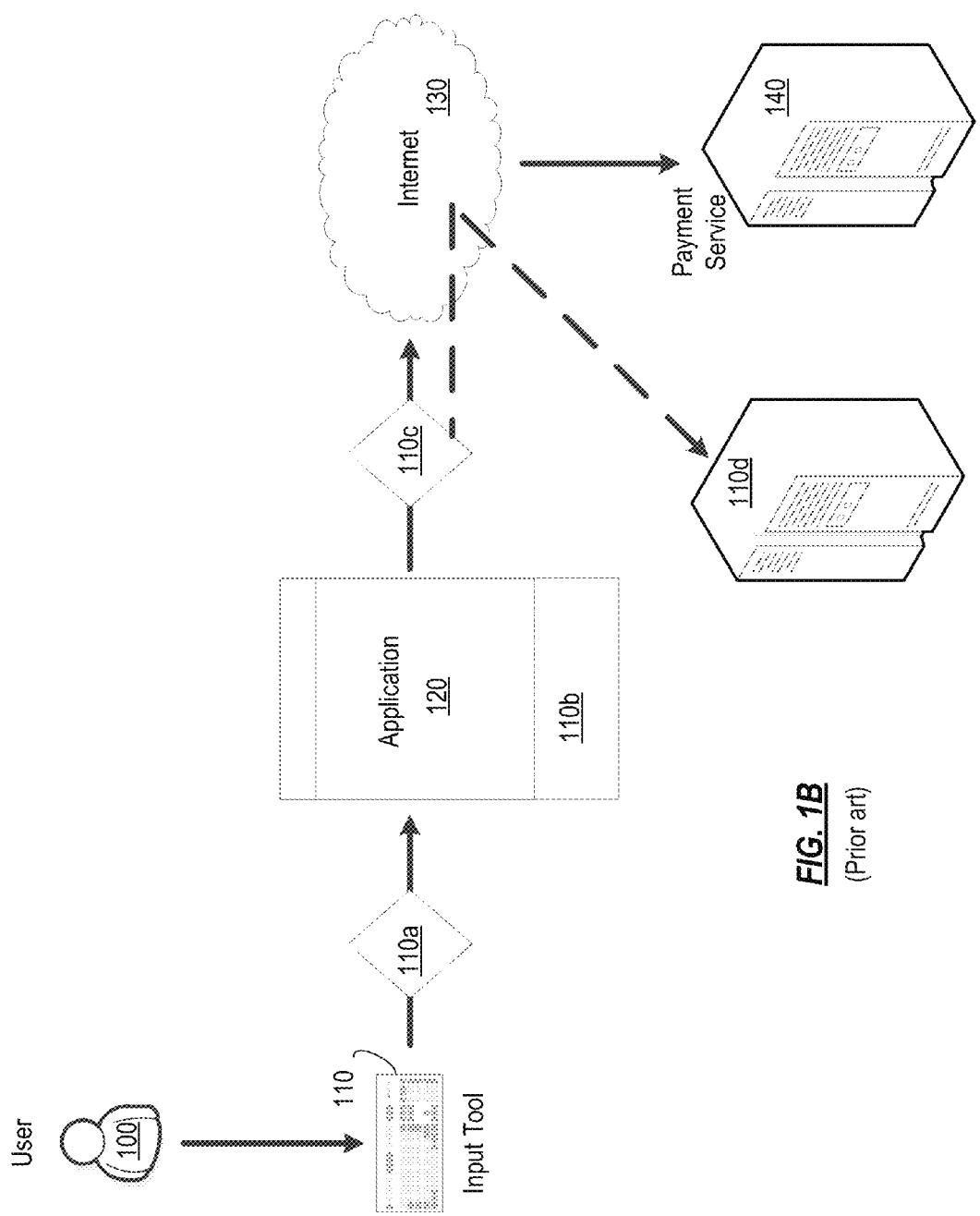
FIG. 1B is a diagram illustrating various types of threats targeting online transactions.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the present invention can be implemented as part of a computer system. The computer system can be one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

FIG. 1A is a diagram illustrating a typical arrangement for conducting online transactions. The user 100, using an input device 110, inputs all required information into online transaction application 120. The input device 110 can be a keyboard, a mouse, a touch screen, or the like, which allows the user to manually enter data. The online transaction application 120 can be a Web browser, with which it is possible to make an online transaction from a certain web page. The online transaction application 120 can also be a specialized banking client, as well as any other application that includes an online transaction functionality (for example, certain gaming applications having their own service for buying virtual items for real currency). For an online transaction to be successfully completed, a connection to the Internet network 130 is required, through which it is possible to make transfers of funds using the payment service 140. In this case, the payment service refers to an entire infrastructure for monetary transactions, including, for example, the infrastructure of the bank that issued the payment card, of the executing bank, and any other intermediaries.

FIG. 1b illustrates various examples of threats to online transactions. One of the possible threats 110a consists in malicious (most often Trojan) programs, such as data input interceptors (also called keyloggers), which intercept data input from a keyboard of a mouse or take screenshots. Data input interception can be made using a library (Dynamic Load Library, DLL), which installs event interceptors. Tracking of keyboard input can occur only in windows with certain titles (i.e. there is a purposeful tracking of applications 120). The malicious program 110*a* saves the gathered input information into a separate file, in order to subsequently transfer (for example, email) it to the offender's side. It should be noted that malicious programs 110*a* use a number of technologies to hide their presence in the system (for example, rootkit technologies) or to complicate their detection by antivirus applications (for example, using code obfuscation). The threats 110*a* can also use system interceptors (for example, for the WINDOWS operating system, this can be interceptors based on the API function HttpSendRequestW( ), HttpSendRequestA( ), HttpOpenRequestA( )) for tracking network requests from the application 120.

Another example of threats is compromising of the application 120 by infecting it with malicious functionality 110*b*. Such functionality 110*b* can have various characteristics, for example, it can be an infection of the executable file of the application 120 by a virus, or it can be addition of a DLL module (Browser Helper Object, BHO) to the browser process. Other examples of functionality 110*b* can be based on the use of vulnerabilities in the application 120, infiltration in the address space of a running process of the application 120, etc.

Another example of computer threats is malicious applications 110*c*, which are intended to intercept and replace network traffic from applications 120. The interception and replacement can be made by adding fake SSL certificates for certain sites, by adding DNS entries for network settings (LAN, Wi-Fi), by modifying the hosts file, etc. Such approaches are intended to redirect the user (or rather the application 120) not to the payment service 140, but to a malicious web resource 110*d* (generally, a phishing site), which can have a similar functionality resembling the online transaction, but in this case the user's funds 100 will be transferred to the offender's account. The malicious web resource 110*d* can also have similar domain names resembling familiar payment services 140, and can have an interface providing the same look and feel, which can mislead the user 100. Another option of the operation of malicious applications 110*c* consists in modifying the reply from the payment service 140, for example, by replacing the web page or by adding a malicious script.

The above-listed threats 110*a*-110*d* quite often operate not as separate applications, but act as a whole combination of inter-related threats to the conduct of illegal online transactions. This is due to the fact that security measures are also constantly being improved—the banks and the owners of payment services 140 improve the quality of their operation, by adding, for example, new methods for user authentication; antivirus companies constantly add new threat detection methods. However, even if it is possible to prevent the operation or the use of almost all threats, a single threat can still cause an unintended online transaction to be carried out or important data to be accessed or otherwise compromised.

Figure 1C:
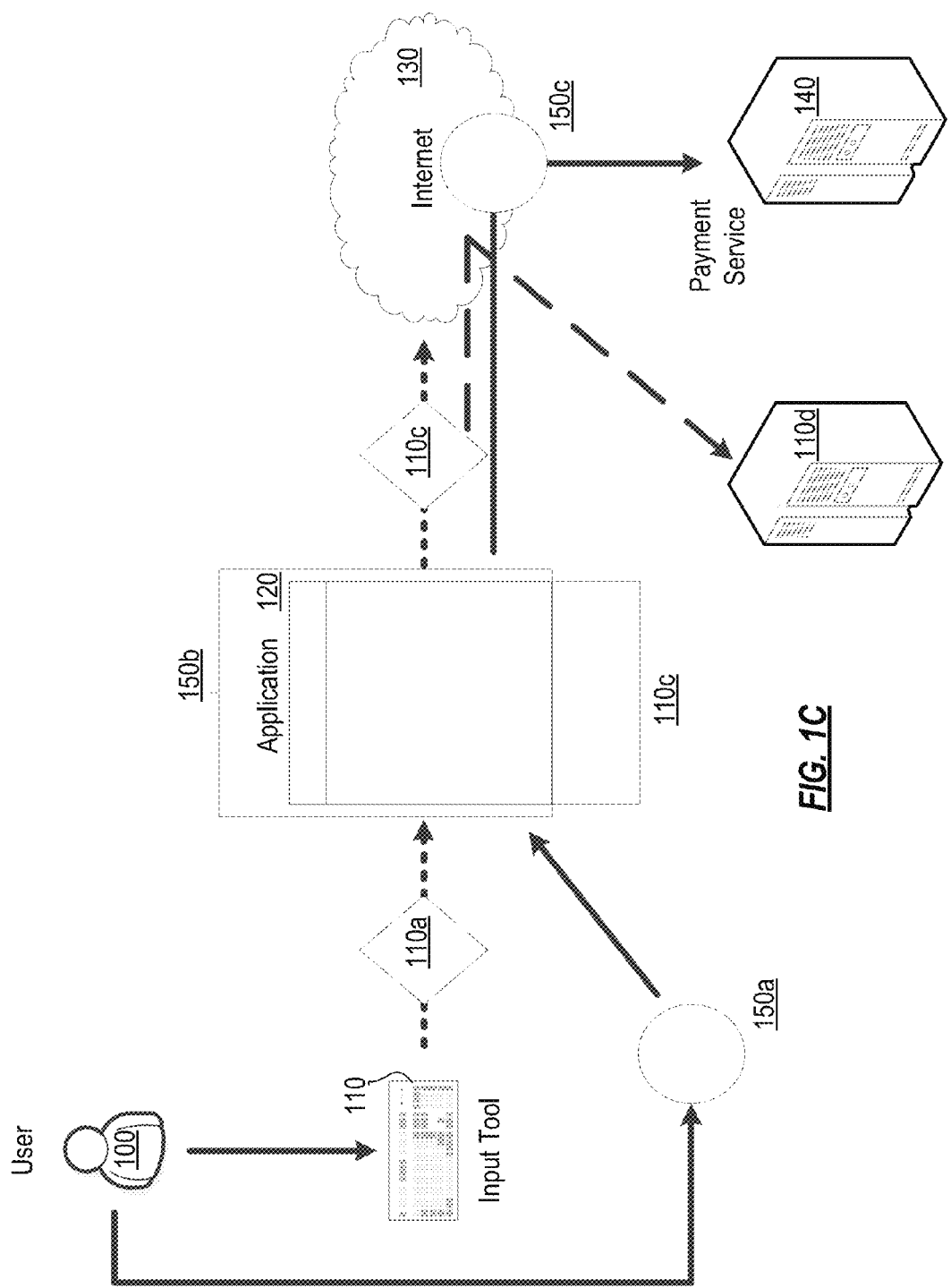
FIG. 1C is a diagram illustrating various modules for protecting online transactions according to aspects of the invention.

FIG. 1C is a diagram illustrating an arrangement for protecting online transactions according to one embodiment of the present invention. The arrangement includes various modules, each of which is constructed, configured, or otherwise adapted, to carry out a function or set of functions. The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers that execute an operating system, system programs, and application programs, while also implementing the module using multitasking, multithreading, distributed (e.g., cluster, peer-peer, cloud, etc.) processing where appropriate, or other such techniques. Accordingly, each module can be realized in a variety of suitable configurations, and should generally not be limited to any particular implementation exemplified herein, unless such limitations are expressly called out. In addition, a module can itself be composed of more than one sub-modules, each of which can be regarded as a module in its own right. Moreover, in the embodiments described herein, each of the various modules corresponds to a defined functionality; however, it should be understood that in other contemplated embodiments, each functionality may be distributed to more than one module. Likewise, in other contemplated embodiments, multiple defined functionalities may be implemented by a single module that performs those multiple functions, possibly alongside other functions, or distributed differently among a set of modules than specifically illustrated in the examples herein.

In order to avoid possible data interception through the input devices 110, the user 100 is provided a protected data input module 150*a*. Generally, such module is provided as a virtual keyboard (e.g., having a form factor of the keyboard delivered logically through a software interface), which can contain a number of security-related features for additional protection from keyloggers, for example, as protection against screenshots (using interception and blockage of screenshot-making processes executed without the use of the PrtScr key on the keyboard, as well as other standard combinations of keys: Alt+PrtScr; Ctrl+PrtScr). Other embodiments of the protected data input module 150*a* can also include hardware data input devices with realization of a separate driver in the operating system (OS) for conversion of the data input from the protected data input module 150*a* into a set of symbols for use by the running application 120 receiving the input. This device driver would operate in lieu of the standard keyboard device driver of the OS. Also, the realization of the protected data input module 150*a* can use approaches for protection of the clipboard—for example, by monitoring data transfer between various processes and the process of the application 120. For example, the module 150*a* can block access to the clipboard for all applications, except the application 120 and a number of dedicated processes (for example, the process of the Notepad application or the front view process from where the user can copy the required data). Accordingly, protected data input module 150*a* can apply various degrees of protection, depending on the type of protection functionality is selected.

In order to prevent possible compromising of the application 120, a protected environment module 150*b* is employed, which in various embodiments can implement one, or a combination of, technologies such as:

Use of "sandbox" technologies, e.g., an isolated, restricted environment in which certain functions are prohibited;

Protection of a launched process of the application 120 by checking (prohibiting) modifications in the address space of the process (i.e. prevention of code infiltration), analyzing the launch of new streams within the process of the application 120, etc.;

Tracking of suspicious operations during the execution of the streams of the launched process of the application 120. Such tracking can be realized using the technologies described in U.S. Patent Application Publication No. 2011/0083176, the disclosure of which is incorporated by reference. Within this approach, it is possible to prohibit the following operations for the process of application 120 on the part of other processes: code infiltration, direct access to the memory, making of screenshots, attempts to call for subsidiary processes of the process of application 120;

Use of a virtual machine on which the application 120 will be launched;

Launch of a substitute application for the realization of the capabilities of the application 120. For example, in the case of a browser, this can be the use of a simplified browser version, which realizes a minimum functionality set for the conduct of online transactions (sending and receiving web requests, displaying web pages, authorization and work with an SSL protocol, etc.).

Accordingly, protected environment module 150b can apply various degrees of protection for application 120, depending on the type of protection functionality is selected.

In order to avoid possible interception and/or modification of data that will be sent by the application 120 through the Internet 130 to the payment service 140, a safe data transfer module 150c can be used, which selectively performs one or more of the following functions in one embodiment:

Tracking and checking of the domain name of the payment service 140 in order to suppress access to malicious web resources 110d. Databases of malicious web resources are maintained by many antivirus product developers (for example, McAfee, Symantec, Kaspersky Lab companies);

Verification of digital certificates of payment services using the approaches described, for example, in U.S. Pat. No. 7,739,494, the disclosure of which is incorporated by reference herein;

Verification of the content of a payment service—for example, using the technology disclosed in U.S. Pat. No. 8,370,939, the disclosure of which is incorporated by reference herein.

Accordingly, safe data transfer module 150c can apply various degrees of protection, depending on the type of protection functionality is selected, to determine whether the connection to the remote payment service is with a correct and reputable party.

Figure 2:
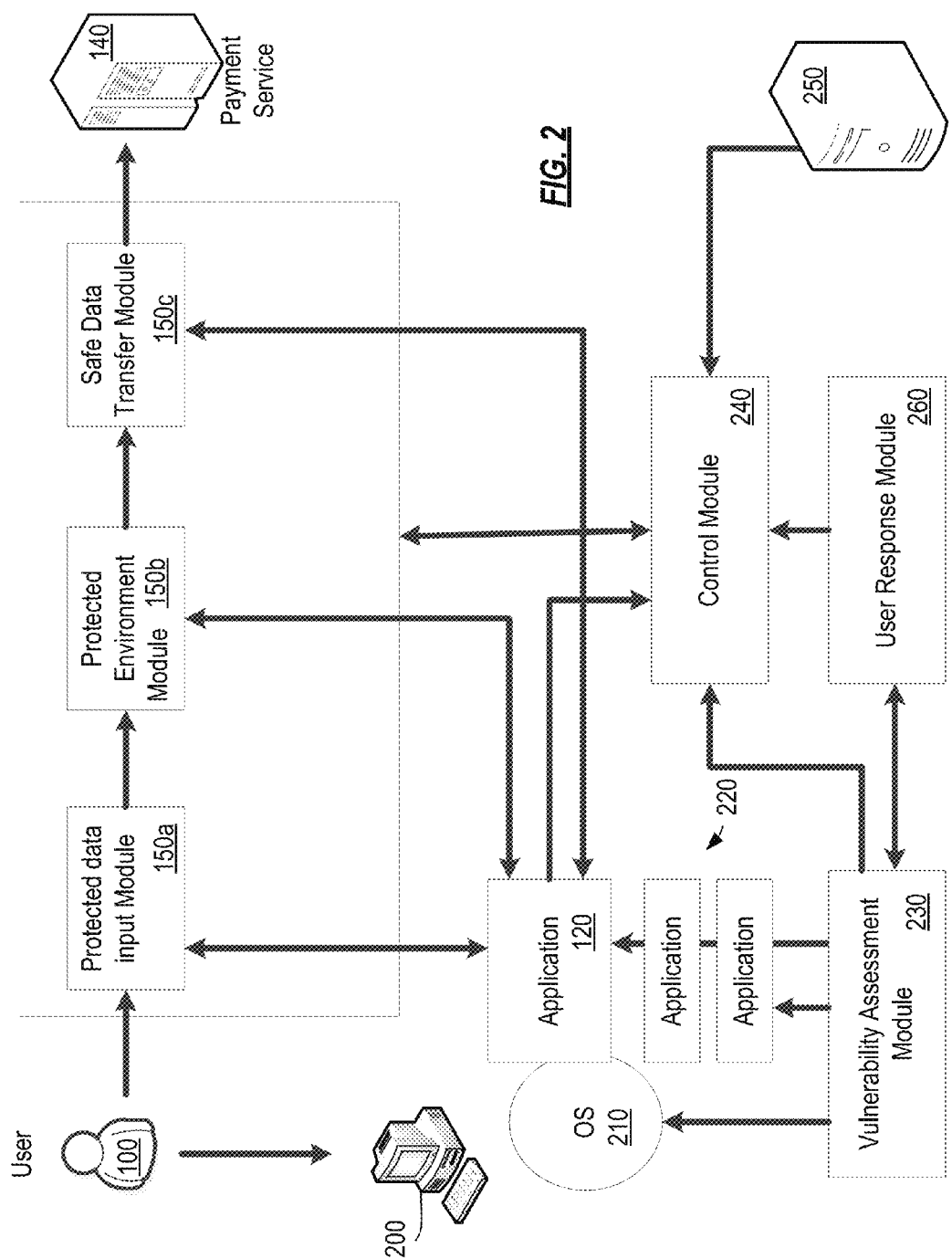
FIG. 2 is a diagram illustrating a system for protection of online transactions according to one embodiment of the invention.

FIG. 2 is a diagram illustrating a system for protection of online transactions according to one embodiment of this invention. The user 100 uses a computer 200, on which an operating system (OS) 210 is installed, and on which applications 220, of which at least one application 120 allows the user to conduct online transactions. The vulnerability assessment module 230 is programmed or otherwise configured to analyze OS 210 and the application 120 for presence of vulnerabilities, the settings files, the list of installed drivers and launched services, and other data related to computer security, in order to determine the risk during possible conduct of an online transaction. Risk assessment can be performed using a number of metrics—for example, using a Common Vulnerability Scoring System (CVSS), which can include detailed information on vulnerabilities (criticality, possible consequences of the use of a vulnerability, methods for eliminating vulnerability). Examples of criteria for the operation of the vulnerability assessment module include the following:

Degree of risk (criticality, possible consequences of the use of a vulnerability), including vulnerabilities of the application 120 for the conduct of online transactions;

Security-related incidents having occurred on the local computer 200 (detection of malicious programs, network attacks, spam, etc.), and logged by the OS;

Incidents on the network on which the computer 200 is located (network attacks, service denial, etc.);

Status of the antivirus software (time of the last update of antivirus databases, accessibility of antivirus servers for requests, etc.);

Use of hardware authentication modules. If such modules are used, the possibility of compromising an online transaction is reduced, and consequently, the risks decrease;

Frequency of the conduct of online transactions. When the frequency of online transactions is increased on the user side, it generally increases the risk of conduct of unauthorized transactions, which the user may not notice at once due to a large number of transactions;

The user's behavior, which can characterize him/her as a user with a risk of infection by unknown malicious programs. One of the approaches described in U.S. Pat. No. 8,312,536, the disclosure of which is incorporated by reference, assesses the user's reputation based on the reputation of the data that the user operates during his/her work—for example, files or sites. The more malicious data that is contained in such data, the worse the user's reputation can be, which increases the risk during an online transaction.

In one embodiment, the vulnerability assessment module automatically acts to resolve the detected vulnerabilities by downloading and installing updates (patches) for vulnerable applications, and change the settings of the application's operation in order to reduce the risk when conducting online transactions.

Listed below are examples of risks related to the conduct of online transactions:

Loss of personal data, such as the user's identification information;

Incorrect conduct of the current online transaction;

Third parties gaining unauthorized access to the modules for storage and conduct of online transactions—for example, to applications 120 or digital wallets.

In a related embodiment, vulnerability assessment module 230 can calculate the risk of conducting online transactions based on the present conditions. The extent of the risk can be expressed as a number or a certain value. An example of the risks is provided below in Table 1.

TABLE 1

| Conditions | Risk (number) | Risk (value) |
|---|---|---|
| The application 120 is a separate application for conduct of a certain type of online transactions; Hardware confirmation of online transactions; The antivirus application has the latest version of antivirus databases. | 1 | Low |
| The application 120 is a browser; Confirmation of transactions occurs through data input from a keyboard by the user; The antivirus application has the latest version of antivirus databases. | 2 | Medium |

TABLE 1-continued

| Conditions | Risk (number) | Risk (value) |
|---|---|---|
| The application 120 is a browser; Confirmation of transactions occurs through data input from a keyboard by the user; The antivirus application has an obsolete version of antivirus databases; A number of incidents related to malicious programs is identified. | 3 | High |

Once the vulnerability assessment module 230 determines a degree of risk of conducting online transactions, it sends this information to the control module 240, which is programmed or otherwise configured to regulate the operation of the protected data input module 150a, protected environment module 150b and the safe data transfer module 150c. According to various embodiments, depending on the received information, the control module 240 can set operation of the various protection modules.

The protected data input module 150a can be either disabled (if it is not required to use data input from the user himself—for example, when hardware modules for confirmation of the online transaction are used), or enabled, depending on a number of conditions, including information on the application 120 (application type, presence of vulnerabilities, need for data input, etc.), OS 210, etc. Also, when the protected data input module is enabled, various settings can be selected based on a decision by the control module 240. For instance, a safe and reliable virtual keyboard can be provided in one operating system, but not in another operating system. There may also be differences among operating systems in the driver stack or other low-level application programming interface (API). Similarly, clipboard protection (i.e., preventing unauthorized access to the contents of the clipboard) may be present in one operating system, but not another. These conditions are assessed by vulnerability assessment module 230, and are treated as potential risks to be addressed. Accordingly, if there is a risk associated with an operating system's built-in protections, a separate functionality provided by protected data input module 150a is enabled by control module 240 to cover for any deficiency in the OS. In the case where the OS provides adequate protection, the OS can be relied upon for certain protection functionality.

In a related embodiment, the user's preferences are taken into account by control module 240. In one such approach, as illustrated, the system includes user response module 260, which monitors actions taken by the user that reflect the user's preferences relating to the online transaction security system. For instance, in spite of a recommendation for the user to use a virtual keyboard (which may be realized as the launching of a virtual keyboard in response to detection of an online transaction taking place), the user may opt out of using the virtual keyboard in favor of using a physical keyboard. This opting-out, as detected by user response module 260, may take the form of the user closing the virtual keyboard upon its launch and prior to entering any data using the virtual keyboard. In a related example, an opting out may be registered by the user response module 260 when the user closes the virtual keyboard before completion of the online transaction (i.e., when the user closes the virtual keyboard and proceeds to enter information into the session using the physical keyboard in lieu of the virtual keyboard) notwithstanding having used it to some extent.

It should be noted that user response module 260 infers user preferences according to the examples provided above, based on certain patterns of user actions. In a related embodiment, user response module reads user preferences that are entered directly into a user settings interface by the user. Typically, more advanced users will take the time to enter their preferences into an "advanced settings" interface from which this information can be more directly obtained. In one embodiment, the directly-set user preferences are given priority by default over patterns of user actions, but a consistent, repeated, pattern of actions that contradicts certain user preference settings (e.g., the consistency and repetition of such actions exceeding set thresholds) can cause the user response module 260 to override the default preference settings based on the observed user actions.

Protected data input module 150a, protected environment module 150b, and safe data transfer module 150c can each use various approaches for protecting the transaction. For instance, as described above, protected environment module 150b can selectively apply a sandbox or a virtual machine in which to execute application 120, or it can monitor of the execution of various process streams relating to the application, etc. According to one embodiment, controller module 240 controls which particular protection operations are applied based on the risk level. In one example, a greater risk score calls for more aggressive protection by protected environment module 150b. (e.g., if the risk level is high, a separate virtual machine can be used; the network connections will be established through a separate VPN connection; while if the risk level is low, the protected environment can be simply absent). Various degrees of protection by protected environment module 150b are contemplated that would fall between the degrees of protection (or lack thereof) of these two examples. In a related embodiment, these protective features may be scaled back based on the user preferences.

In one embodiment, the safe data transfer module 150c can use not only the risk level for checking the transferred data, but also information on the application 120 being used (for example, if a browser is used, the module will check the URL addresses called during the online transaction, the digital certificates of the sites of the payment service 140, etc.).

In a related embodiment, the settings of the protected data input module 150a, the protected environment module 150b and the safe data transfer module 150c can be changed by the user or the administrator in order to simplify the process of conducting online transactions. For this purpose, the control module 240 can have its own interface (Graphics User Interface, GUI). In a preferred embodiment, the control module 240, the protected data input module 150a, the protected environment module 150b, the safe data transfer module 150c, the vulnerability assessment module 230, and the user response module 260 are implemented as a separate application or can be included as a component that is part of an antivirus application, which is executed on a computing system to form a special-purpose apparatus for protecting financial transactions being carried out using the same computer system.

The control module 240 is also configured to determine the start of an online transaction, for the activation of the operation of the protected data input module 150a, protected environment module 150b, safe data transfer module 150c, the vulnerability assessment module 230, and the user response module 260, either separately for each of the above-listed modules, or for all of them together.

In order to receive information on vulnerabilities, malicious applications, and other information related to the safety of online transactions, the control module 240 contacts the reputation service 250. Such services can be made as a remote cloud service, or as a local database containing the following information:

- information on vulnerabilities;
- a phishing sites database;
- a digital certificates database;
- heuristic rules for detecting phishing sites of payment services, as well as malicious scenarios, which can be executed when such sites are contacted;
- rules for the setup of the 150a-150c protection modules.

User response module 260 can be configured, according to various embodiments, to monitor user activity reflecting preferences not only for protected data input module 150a, but also for protected environment module 150b and safe data transfer module 150c, in various combinations. With regard to protected environment module 150b, the user may express frustration with reduced system responsiveness by operation of a virtual machine, for example. To this end, an input may be provided via the user interface with which the user may indicate a preference for speeding up the system's responsiveness. For instance, an "I trust this bank or vendor" option may be provided via a plug-in or system tray-accessible control in one type of embodiment.

In response to information gleaned by user response module 260, control module 240 takes action to adjust the operational settings of protected data input module 150a, protected environment module 150b, and safe data transfer module 150c, as appropriate, to provide an extent of protection functionality corresponding to the risks assessed by vulnerability assessment module 230 but also consistent with user preferences ascertained by user response module 260. If it is not possible to provide a full set of required protection, control module 240 is configured to provide as much protection as is tolerable by the user, based on an assessment by control module 240. Also, a notification can be made to the user via the user interface, in cases where the tolerable level of protection according to the user's preferences is below the recommended level of protection based on the assessed risk level and the decision logic of control module 240.

To achieve this level of decision-making, in one embodiment control module 240 is programmed or otherwise configured with a database containing a hierarchy of protection settings that represent each item of protective functionality in terms of its degree of protection and its burden on user experience. Based on the user preference and assessed risk level, control module 240 enables or disables certain functions, or adjusts their relative operability to utilize fewer or more system resources. In a related embodiment, the database contains substitute functions that are mapped to primary functions, and which may be enabled or have their functionality increased in response to a call for reduction or disablement of the corresponding primary function. For instance, in response to a call for disabling a virtual keyboard, control module 240 can adjust protected data input module to implement its own secure stack input characters for entry directly into a banking application. In a related embodiment, in response to a call for disabling a virtual keyboard, a more secure protected environment is established, e.g., sandbox, virtual machine, etc.

Figure 3:
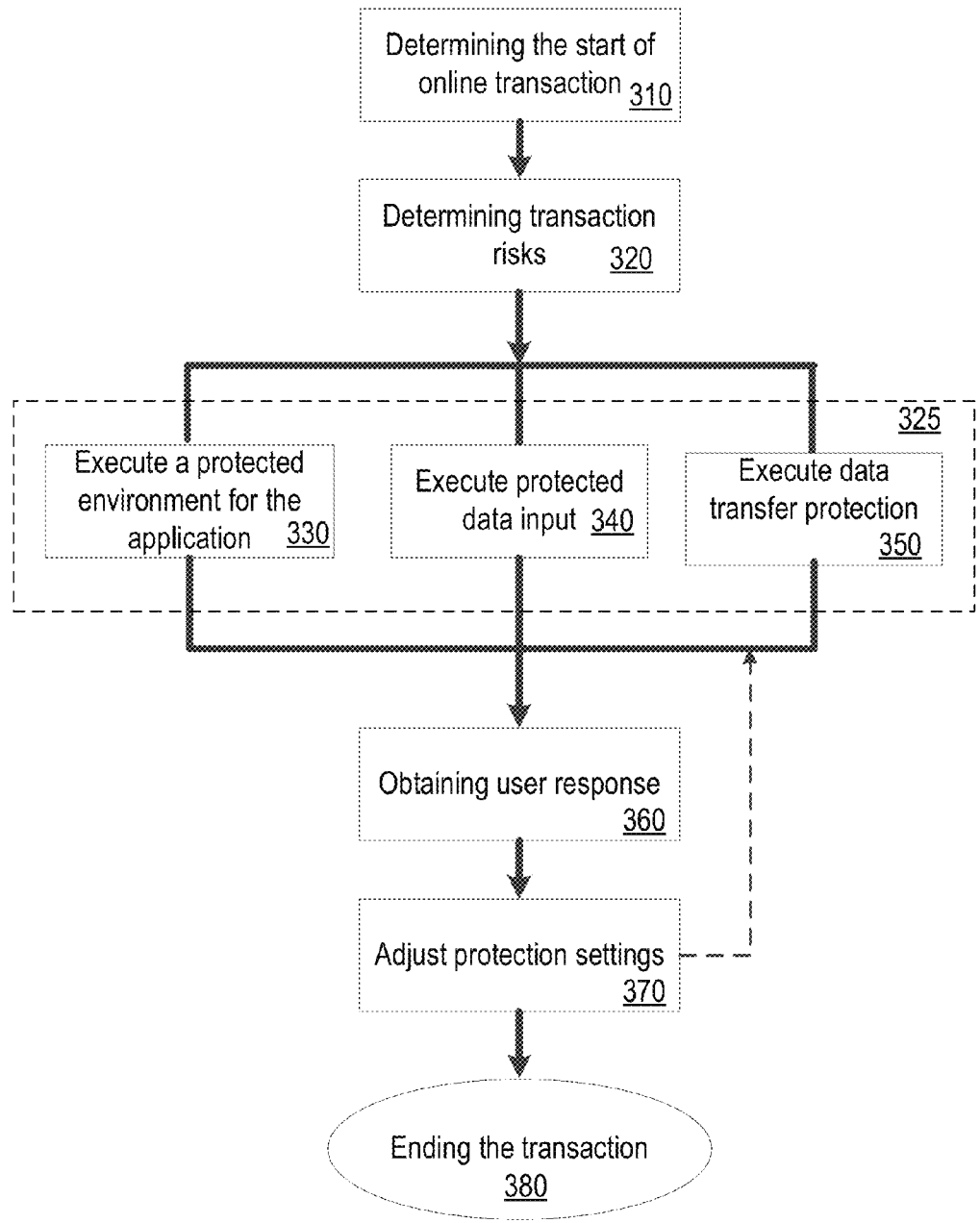
FIG. 3 is a diagram illustrating a method for protecting online transactions according to one embodiment of the invention.

FIG. 3 illustrates a method of operation of a transaction protection service, such as one realized by the system depicted in FIG. 2 according to one embodiment. Block 310 determines the start of the online transaction, which can be based on:

- the launch of the application 120;
- the determination of the moment of the start of the online transaction through the application 120 accessing a known payment service 140 or receiving content indicative of a connection to a payment service (known or otherwise); or
- a defined set of conditions or pattern of actions by the user.

The following characteristics can be an example of the moment of the start of an online transaction in the case of a web browser: opening of a known web page of a payment service 140 (in the case of online banking, this will be the bank's site); establishment of a https connection; presence of characteristic data input fields on the page (login-password).

The transaction start moment can be also set by the user himself in cases where learning is needed in order to identify similar cases in the future. The following factors can be used for the learning:

- requests to network resources, which can belong to financial institutions (for example, bank sites) for their correct identification as payment services 140 in the future. In the caser of a browser, this can be a visit to such sites as ebay.com, walmart.com, bestbuy.com, newegg.com and other similar sites;
- presence of elements with data input possibility in the active window of the application 120; in this case, the elements can have characteristic names (identifier, login, password, ID, etc.) and can contain other properties indicating a data input possibility (for example, for an HTML element, the input of a password into a text field also contains the type="password" value);
- information on the application 120, identifying it as an application for conduct of online transactions. For example, for a separate banking client, a digital signature can prove that the digital signature belongs to the bank, which will tell that this client will most probably be used for online transactions.

Once the start of the online transaction is determined at 310, in one embodiment, the risks of the online transaction are scored at 320. At this stage, it is also possible to reduce the online transaction risks by installing updates in order to patch the vulnerabilities or to inform the user of the risk. Then, at 325 the transaction protection services are executed. These include execution of a protected environment for the application 120 at 330. At 340, the protected data input module 150a is executed to prevent unauthorized processes from accessing the input sequences generated by an input device such as a keyboard or touchscreen, while permitting these input sequences to be passed to the proper process receiving the input. At 350, the data transfer protection for network communications is executed. In addition to the above-described approaches (i.e., verification of domain names, digital certificates, etc.), it is also possible to use the establishment of a protected connection (for example, a virtual private network (VPN) connection), where the current connection to the payment service 140 is encapsulated.

Protection services 330, 340, and 350 are configured in part, according to the assessed risk level. Based on pre-defined operational setting criteria, the assessed level of risk associated with the transaction causes the protection scheme established by the collective operation of the three types of protection services to be set such that a sufficient level of protection is provided (as defined by the operational setting criteria). These initial operational settings achieve an initial degree of protection by each of the protection services.

At 360, user response is obtained and related to the transaction protection services. In various embodiments, the user response can be recognized from user actions affecting the operation of the transaction protection service, whether those actions are direct (i.e., response to a "cancel protection" option, user-driven change in settings for the transaction protection functions, etc.), or indirect (user-driven closing of a virtual keyboard module after its launch or after some partial use thereof). In response to the user response, at 370, the operational parameters of one or more of the protection services 330, 340, 350 are adjusted to accord with the inferred user's preference. This automated response may involve making certain protections less aggressive to improve the user experience, while also making other protection services more aggressive to address the reduction in level of protection due to the reduction of protection level in the first instance. For instance, in a scenario where a virtual keyboard is called for, but a VPN is not, a user action to disable the virtual keyboard can result in an establishment of the VPN connection to provide a partially-overlapping, if not equivalent, type of protection.

In other exemplary cases, the overall level of protection may be reduced to suit the user's preference, and in response, a warning message is displayed for the user indicating that the level of protection is now less than the recommended level under the present circumstances. This type of warning message, in one embodiment, is triggered when the level of protection (expressed numerically or otherwise) is less than the recommended level of protection (according to predefined criteria) by a defined threshold.

Once all data are transferred and the transaction is completed, at 380, the system ends its protection services operation. It should be noted that the operations at blocks 330-350 do not have to happen in any particular sequence, as depicted in FIG. 3; for example, information on the payment service 140 that the application 120 is trying to contact can be verified first, and only then the system will ensure the protected environment and the protected data input.

In one embodiment, in order to protect web banking using a browser, a method can have the following operations:
Opening of an internet connection;
Verification of the match of the requested web page with the bank's site;
Determination of the resource's authenticity by verifying the digital certificate;
Analysis of presence of vulnerabilities in the OS;
Blockage of the use of the bank's web page in unprotected mode;
Launch of a protected browser, which displays only the field required to enter web banking;
Protection of the user's data input during the online banking session;
Ending of the protected session when closing the browser.

Figure 4:
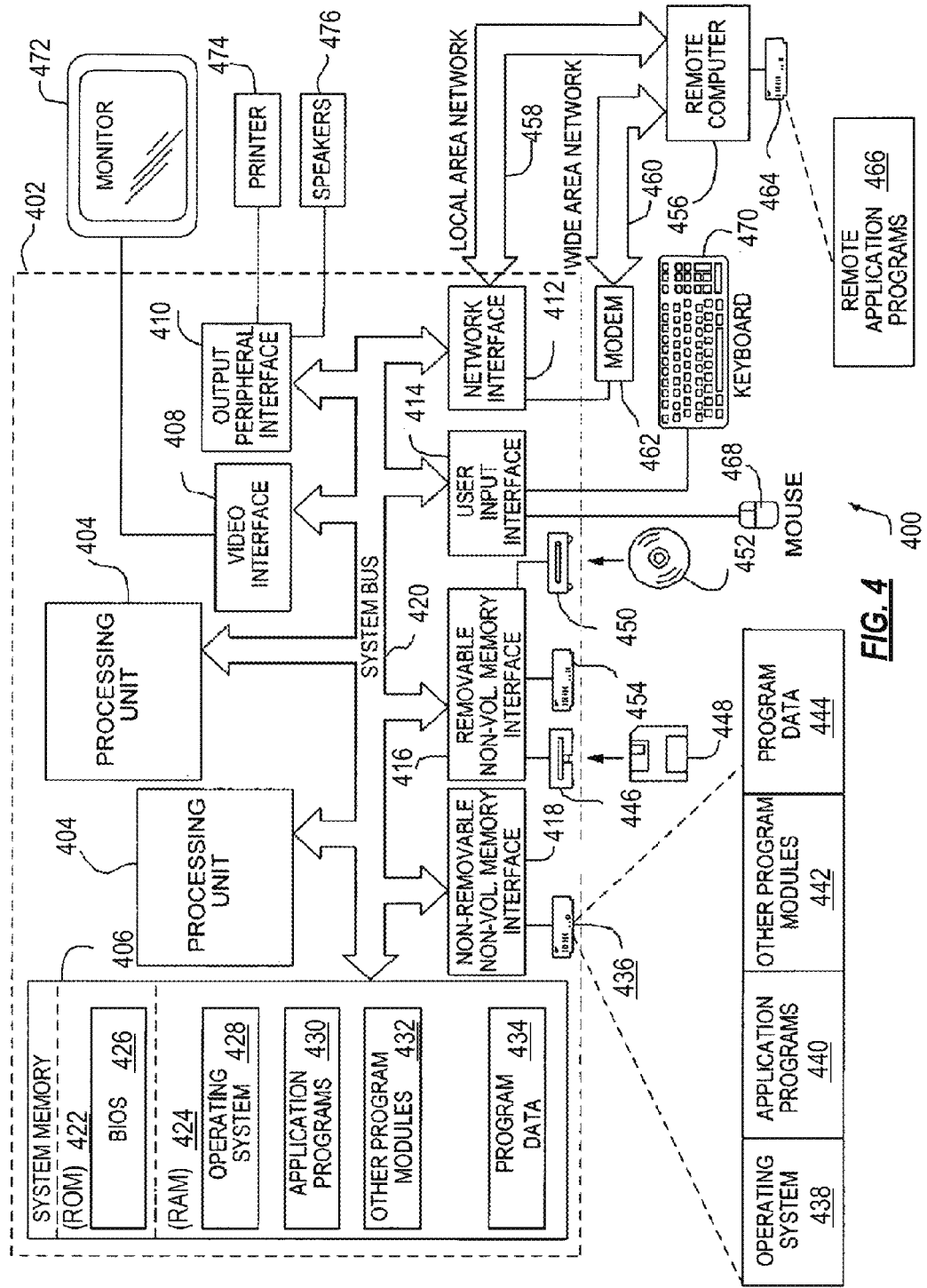
FIG. 4 is a diagram illustrating a general-purpose computer system on which aspects of the invention may be implemented.

FIG. 4 is a diagram illustrating in greater detail a computer system 400 on which aspects of the invention as described herein may be implemented according to various embodiments. The computer system 400 may include a computing device such as a personal computer 402. The personal computer 402 includes one or more processing units 404, a system memory 406, a video interface 408, an output peripheral interface 410, a network interface 412, a user input interface 414, removable 416 and non-removable 418 memory interfaces and a system bus or high-speed communications channel 420 coupling the various components. In various embodiments, the processing units 404 may have multiple logical cores that are able to process information stored on computer readable media such as the system memory 406 or memory attached to the removable 416 and non-removable 418 memory interfaces 418. The computer 402 system memory 406 may include non-volatile memory such as Read Only Memory (ROM) 422 or volatile memory such as Random Access Memory (RAM) 424. The ROM 422 may include a basic input/output system (BIOS) 426 to help communicate with the other portion of the computer 402. The RAM 424 may store portions of various software applications such as the operating system 428, application programs 430 and other program modules 432. Further, the RAM 424 may store other information such as program or application data 434. In various embodiments, the RAM 424 stores information that requires low-latencies and efficient access, such as programs and data being manipulated or operated on. In various embodiments RAM 424 comprises Double Data Rate (DDR) memory, Error Correcting memory (ECC) or other memory technologies with varying latencies and configurations such as RAMBUS or DDR2 and DDR3. In this way, in various embodiments, the system memory 406 may store the input data store, access credential data store, operating memory data store, instruction set data store, analysis result data store and the operating memory data store. Further, in various embodiments, the processing units 404 may be configured to execute instructions that limit access to the aforementioned data stores by requiring access credential before access to the information is granted.

The removable 416 and non-removable 418 memory interfaces may couple the computer 402 to disk drives 436 such as SSD or rotational disk drives. These disk drives 436 may provide further storage for various software applications such as the operating system 438, application programs 440 and other program modules 442. Further, the disk drives 436 may store other information such as program or application data 444. In various embodiments, the disk drives 436 store information that doesn't require the same low-latencies as in other storage mediums. Further, the operating system 438, application program 440 data, program modules 442 and program or application data 444 may be the same information as that stored in the RAM 424 in various embodiments mentioned above or it may be different data potentially derivative of the RAM 424 stored data.

Further, the removable non-volatile memory interface 416 may couple the computer 402 to magnetic portable disk drives 446 that utilize magnetic media such as the floppy disk 448, Iomega® Zip or Jazz, or optical disk drives 450 that utilize optical media 452 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 402 may utilize the network interface 412 to communicate with one or more remote computers 456 over a local area network (LAN) 458 or a wide area network (WAN) 460. The network interface 412 may utilize a Network Interface Card (NIC) or other interface such as a modem 462 to enable communication. The modem 462 may enable communication over telephone lines, coaxial, fiber optic, powerline, or wirelessly. The remote computer 456 may contain a similar hardware and software configuration or may have a memory 464 that contains remote application programs 466 that may provide additional computer readable instructions to the computer 402. In various embodiments, the remote computer memory 464 can be utilized to store information such as identified file information that may be later downloaded to local system memory 406. Further, in various embodiments the remote computer 456 may be an application server, an administrative server, client computers, or a network appliance.

A user may enter information to the computer 402 using input devices connected to the user input interface 414 such as a mouse 468 and keyboard 470. Additionally, the input device may be a trackpad, fingerprint scanner, joystick, barcode scanner, media scanner or the like. The video interface 408 may provide visual information to a display such as a monitor 472. The video interface 408 may be an embedded interface or it may be a discrete interface. Further, the computer may utilize a plurality of video interfaces 408, network interfaces 412 and removable 416 and non-removable 418 interfaces in order to increase the flexibility in operation of the computer 402. Further, various embodiments utilize several monitors 472 and several video interfaces 408 to vary the performance and capabilities of the computer 402. Other computer interfaces may be included in computer 402 such as the output peripheral interface 410. This interface may be coupled to a printer 474 or speakers 476 or other peripherals to provide additional functionality to the computer 402.

Various alternative configurations and implementations of the computer 402 are within the spirit of the invention. These variations may include, without limitation, additional interfaces coupled to the system bus 420 such as universal serial bus (USB), printer port, game port, PCI bus, PCI Express or integrations of the various components described above into chipset components such as the northbridge or southbridge. For example, in various embodiments, the processing unit 404 may include an embedded memory controller (not shown) to enable more efficient transfer of data from the system memory 406 than the system bus 420 may provide.

Figure 5:
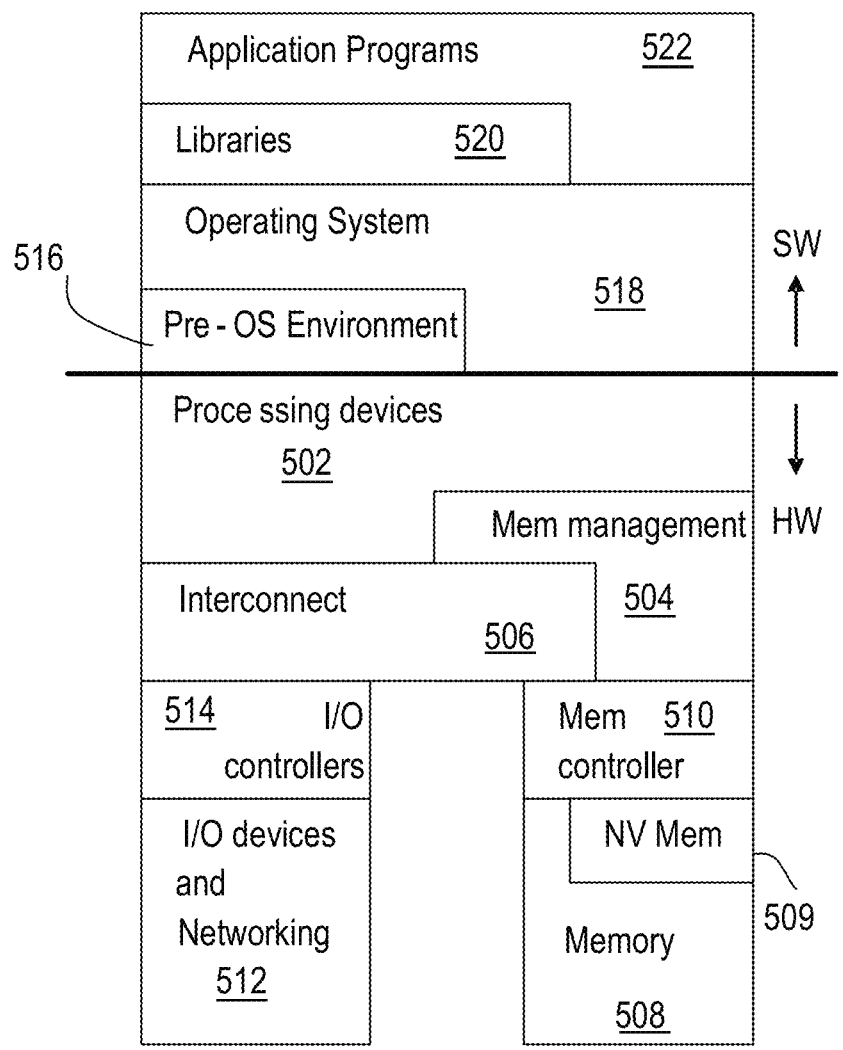
FIG. 5 is a diagram illustrating an exemplary hardware and software architecture of a computer system such as the one depicted in FIG. 4, in which various interfaces between hardware components and software components are shown.

FIG. 5 is a diagram illustrating an exemplary hardware and software architecture of a computer system such as the one depicted in FIG. 4, in which various interfaces between hardware components and software components are shown. As indicated by HW, hardware components are represented below the divider line, whereas software components denoted by SW reside above the divider line. On the hardware side, processing devices 502 (which can include one or more microprocessors, digital signal processors, etc., each having one or more processor cores, are interfaced with memory management device 504 and system interconnect 506. Memory management device 504 provides mappings between virtual memory used by processes being executed, and the physical memory. Memory management device 504 can be an integral part of a central processing unit which also includes the processing devices 502.

Interconnect 506 includes the memory, data, and control busses, as well as the interface with peripherals, e.g., PCI, USB, etc. Memory 508 (e.g., dynamic random access memory—DRAM) and non-volatile memory 509 sush as flash memory (i.e., electrically-erasable read-only memory—EEPROM) are interfaced with memory management device 504 and interconnect 506 via memory controller 510. This architecture can support direct memory access (DMA) by peripherals. I/O devices, including video and audio adapters, disk storage, external peripheral busses such as USB, Bluetooth, etc, as well as network interface devices such as those communicating via Ethernet or Wi-Fi interfaces, are collectively represented as I/O devices and networking 512, which interface with interconnect 506 via corresponding I/O controllers 514.

On the software side, a pre-operating system (pre-OS) environment 516, which is executed at initial system start-up and is responsible for initiating the boot-up of the operating system. One traditional example of pre-OS environment 516 is a system basic input/output system (BIOS). In present-day systems, a unified extensible firmware interface (UEFI) is implemented. Pre-OS environment 516, described in greater detail below, is responsible for initiating the launching of the operating system, but also provides an execution environment for embedded applications according to certain aspects of the invention. Operating system 518 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 518 provides device drivers, and a variety of common services such as those that facilitate interfacing with peripherals and networking, that provide abstraction for application programs so that the applications do not need to be responsible for handling the details of such common operations. Operating system 518 additionally provides a graphical user interface (GUI) that facilitates interaction with the user via peripheral devices such as a monitor, keyboard, mouse, microphone, video camera, touchscreen, and the like.

Libraries 520 include collections of program functions that provide further abstraction for application programs. These include shared libraries, dynamic linked libraries (DLLs), for example. Libraries 520 can be integral to the operating system 518, or may be added-on features, or even remotely-hosted. Libraries 520 define an application program interface (API) through which a variety of function calls can be made by application programs to invoke the services provided by the operating system 518. Application programs 522 are those programs that perform useful tasks for users, beyond the tasks performed by lower-level system programs that coordinate the basis operability of the computer system itself.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. In a computing system that includes a processor, data storage, and input/output devices including a network interface device configured to communicate over a network, and an operating system, a method for securing online financial transactions, the method comprising:
   detecting, by the computing system, a start of an online financial transaction over the network between a user-controlled online transaction application executing on the computing system and a remote payment service based on at least one of a launch of the online transaction application, access of the remote payment service over the network, transmission of content indicative of a connection to the remote payment service, or a predefined pattern of activity;
   executing, by the computing system, a protected data input module configured to apply a selected protection scheme to limit access by unauthorized processes to an input sequence via at least one of the input/output devices over the network while permitting the input sequence to be accepted by an authorized process;
   executing, by the computing system, a protected environment module configured to apply a selected protection scheme to protect the user-controlled online transaction application from being compromised by malware;
   executing, by the computing system, a safe data transfer module configured to apply a selected protection scheme to determine whether a connection with the remote payment service over the network is a correct connection with a reputable party;
   in response to detection of the start of the financial transaction, assessing, by the computing system, a risk level of conducting the financial transaction on the network based on a vulnerability assessment and on a present condition of the computing system including the input device operated by the user, wherein the vulnerability assessment includes a weighted determination including consideration of vulnerabilities of the online financial transaction application, incidents logged in the operating system, incidents having occurred on a local network computing system, update status of an antivirus program installed on the computing system, use of hardware authentication modules on the computing system, frequency of online financial transactions by the computing system, and a nature of data having been accessed by the user;
   setting, by the computing system, an initial protection scheme for each of the protected data input module, the protected environment module, and the safe data transfer module based on the risk level;
   adjusting, by the computing system, a protection scheme for at least one of the protected data input module, the protected environment module, and the safe data transfer module based on the risk level to a different protection scheme than the initial protection scheme for each of the at least one corresponding modules, wherein adjusting the protection scheme includes accessing a plurality of protection settings that represent each item of protective functionality facilitated by the protected data input module, the protected environment module, and the safe data transfer module, and changing at least one of the protection settings of the plurality of protection settings to either increase, or decrease, an extent of functionality of protection commensurately with the risk level, wherein the plurality of protection settings includes a range of protection levels for the respective protective functionality facilitated by the protected data input module, the protected environment module, and the safe data transfer module, wherein at least one of
      a protected data input level is adjusted among a predetermined range of protected data input levels that differs from the protected data input level set at the initial protection scheme,
      a protected environment module level is adjusted among a predetermined range of protected environment levels that differs from the protected environment module level set at the initial protection scheme, or
      a safe data transfer level is adjusted among a predetermined range of safe data transfer levels that differs from the safe data transfer level set at the initial protection scheme, and
   detecting, by the computing system, completion of the online financial transaction by determining that all data related to the online financial transaction has been transferred on the network; and
   automatically ending, by the computing system, the protection scheme upon detection that the online financial transaction has completed.

2. The method of claim 1, further comprising:
   assessing, by the computing system, user preferences based on responses taken by the user of the computing system corresponding to operation of at least one of the protected data input module, the protected environment module, and the safe data transfer module; and
   wherein the adjusting of the protection scheme is further based on the user preferences.

3. The method of claim 1, wherein detecting the start of an online financial transaction includes at least one of: monitoring for a launch of the online transaction application, monitoring for a connection to the remote payment service via the online transaction application, monitoring for reception of content indicative of a connection to a payment service, or any combination thereof.

4. The method of claim 1, wherein detecting the start of an online financial transaction includes monitoring for access to remote services that are known to redirect connections to payment services.

5. The method of claim 1, wherein executing the protected environment module includes initiating at least one of:
   initiating a sandbox program;
   checking for changes in an address space of a process corresponding to the online transaction application;
   tracking of suspicious operations during execution of streams a process corresponding to the online transaction application;
   initiating a virtual machine in which the online transaction application is to be executed;
   launching a substitute application in place of the online transaction application, wherein the substitute application implements certain capabilities of the online transaction application but lacks certain other capabilities of the online transaction application.

6. The method of claim 1, wherein executing the protected data input module includes initiating at least one of: a virtual keyboard, a clipboard protection program, a dedicated protected device driver for a hardware input device to operate in lieu of a keyboard device driver provided by the operating system.

7. The method of claim 1, wherein assessing the user preferences includes monitoring a user action of opting out of an operation by at least one of the protected data input module, the protected environment module, and the safe data transfer module.

8. The method of claim 1, wherein assessing the user preferences includes monitoring a user action of indicating a preference for operation by at least one of the protected data input module, the protected environment module, and the safe data transfer module.

9. The method of claim 1, wherein assessing the user preferences includes providing a user interface facilitating accepting entry, by the user, of a preference for speeding up responsiveness of the computing system.

10. The method of claim 1, wherein adjusting the protection scheme includes accessing a hierarchy of protection settings that represent each item of protective functionality facilitated by the protected data input module, the protected environment module, and the safe data transfer module in terms of its protection scheme and its burden on user experience of using the computing system.

11. The method of claim 1, wherein adjusting the protection scheme includes replacing a function of at least one of the protected data input module, the protected environment module, and the safe data transfer module with a substitute function.

12. A system for securing online financial transactions, comprising:
  computing hardware, including a processor, data storage, and input/output devices including a network interface device configured to communicate over a network and a graphical user interface;
  an operating system stored in a non-transitory storage medium and executable on the computing hardware;
  a control module configured to detect a start of an online financial transaction over the network between a user-controlled online transaction application executing on the computing hardware and a remote payment service based on at least one of a launch of the online transaction application, access of the remote payment service over the network, transmission of content indicative of a connection to the remote payment service, or a predefined pattern of activity;
  a protected data input module configured to apply a selected protection scheme to limit access by unauthorized processes to an input sequence via at least one of the input/output devices over the network while permitting the input sequence to be accepted by an authorized process;
  a protected environment module configured apply a selected protection scheme of the user-controlled online transaction application from being compromised by malware;
  a safe data transfer module configured to apply a selected protection scheme to determine whether a connection with the remote payment service over the network is a correct connection with a reputable party;
  a vulnerability assessment module configured to assess a risk level of conducting the financial transaction on the network based on a vulnerability assessment and a present condition of the computing system in response to detection of the start of the financial transaction, wherein the present condition includes the input device operated by the user, and wherein the vulnerability assessment includes a weighted determination including consideration of vulnerabilities of the online financial transaction application, incidents logged in the operating system, incidents having occurred on a local network computing system, update status of an antivirus program installed on the computing system, use of hardware authentication modules on the computing system, frequency of online financial transactions by the computing system, and a nature of data having been accessed by the user;
  the control module being further configured to:
    set an initial protection scheme for each of the protected data input module, the protected environment module, and the safe data transfer module based on the risk level;
    adjust a protection scheme for at least one of the protected data input module, the protected environment module, and the safe data transfer module based on the risk level to a different protection scheme than the initial protection scheme for each of the at least one corresponding modules,
      wherein adjustment of the protection scheme includes accessing a plurality of protection settings that represent each item of protective functionality facilitated by the protected data input module, the protected environment module, and the safe data transfer module, and changing at least one of the protection settings of the plurality of protection settings to either increase, or decrease, an extent of functionality of protection commensurately with the risk level, wherein the plurality of protection settings includes a range of protection levels for the respective protective functionality facilitated by the protected data input module, the protected environment module, and the safe data transfer module, wherein at least one of
        a protected data input level is adjusted among a predetermined range of protected data input levels that differs from the protected data input level set at the initial protection scheme,
        a protected environment module level is adjusted among a predetermined range of protected environment levels that differs from the protected environment module level set at the initial protection scheme, or
        a safe data transfer level is adjusted among a predetermined range of safe data transfer levels that differs from the safe data transfer level set at the initial protection scheme, and
    detect completion of the online financial transaction by determining that all data related to the online financial transaction has been transferred on the network; and
    automatically end the protection scheme upon detection that the online financial transaction has completed.

13. The system of claim 12, further comprising:
  a user response module configured to assess user preferences based on responses taken by the user of the computing system corresponding to operation of at least one of the protected data input module, the protected environment module, and the safe data transfer module;
  wherein the control module being further configured to adjust the protection scheme based further on the user preferences.

14. The system of claim 12, wherein the control module is configured to detect the start of an online financial transaction by performing at least one operation selected from the group consisting of: monitoring for a launch of the online transaction application, monitoring for a connection to the remote payment service via the online transaction application, monitoring for reception of content indicative of a connection to a payment service, or any combination thereof.

15. The system of claim 12, wherein wherein the control module is configured to detect the start of an online financial transaction by performing monitoring for access by the online transaction application to remote services that are known to redirect connections to payment services.

16. The system of claim 12, wherein the protected environment module is configured to perform at least one protection operation selected from the group consisting of:
  initiating a sandbox program;
  checking for changes in an address space of a process corresponding to the online transaction application;
  tracking of suspicious operations during execution of streams a process corresponding to the online transaction application;
  initiating a virtual machine in which the online transaction application is to be executed;
  launching a substitute application in place of the online transaction application, wherein the substitute application implements certain capabilities of the online transaction application but lacks certain other capabilities of the online transaction application.

17. The system of claim 12, wherein the protected data input module is configured to initiate at least one of: a virtual keyboard, a clipboard protection program, a dedicated protected device driver for a hardware input device to operate in lieu of a keyboard device driver provided by the operating system.

18. The system of claim 12, wherein the user response module is configured to monitor a user action of opting out of an operation by at least one of the protected data input module, the protected environment module, and the safe data transfer module.

19. The system of claim 12, wherein user response module is configured to monitor a user action of indicating a preference for operation by at least one of the protected data input module, the protected environment module, and the safe data transfer module.

20. The system of claim 12, wherein user response module is configured to provide a user interface facilitating accepting entry, by the user, of a preference for speeding up responsiveness of the computing system.

21. The system of claim 12, wherein the control module is configured to adjust the protection scheme based on accessing a hierarchy of protection settings that represent each item of protective functionality facilitated by the protected data input module, the protected environment module, and the safe data transfer module in terms of its protection scheme and its burden on user experience of using the computing system.

22. The system of claim 12, wherein the control module is configured to adjust the protection scheme based on replacing a function of at least one of the protected data input module, the protected environment module, and the safe data transfer module with a substitute function.

23. In a computing system that includes a processor, data storage, and input/output devices including a network interface device configured to communicate over a network, and an operating system, a system for securing online financial transactions, the system comprising:
  means for detecting a start of an online financial transaction over the network between a user-controlled online transaction application executing on the computing system and a remote payment service based on at least one of a launch of the online transaction application, access of the remote payment service over the network, transmission of content indicative of a connection to the remote payment service, or a predefined pattern of activity;
  means for executing a protected data input module configured to apply a selected protection scheme to limit access by unauthorized processes to an input sequence via at least one of the input/output devices over the network while permitting the input sequence to be accepted by an authorized process;
  means for executing a protected environment module configured apply a selected protection scheme of the user-controlled online transaction application from being compromised by malware;
  means for executing a safe data transfer module configured to apply a selected protection scheme to determine whether a connection with the remote payment service over the network is a correct connection with a reputable party;
  means for assessing a risk level of conducting the financial transaction on the network based on a vulnerability assessment and on present condition of the computing system in response to detection of the start of the financial transaction, wherein the present condition includes the input device operated by the user, and wherein the vulnerability assessment includes a weighted determination including consideration of vulnerabilities of the online financial transaction application, incidents logged in the operating system, incidents having occurred on a local network computing system, update status of an antivirus program installed on the computing system, use of hardware authentication modules on the computing system, frequency of online financial transactions by the computing system, and a nature of data having been accessed by the user;
  means for setting an initial protection scheme for each of the protected data input module, the protected environment module, and the safe data transfer module based on the risk level;
  means for adjusting a protection scheme for at least one of the protected data input module, the protected environment module, and the safe data transfer module based on the risk level to a different protection scheme than the initial degree of protection for each of the at least one corresponding modules,
    wherein the means for adjusting the protection scheme includes means for accessing a plurality of protection settings that represent each item of protective functionality facilitated by the protected data input module, the protected environment module, and the safe data transfer module, and means for changing at least one of the protection settings of the plurality of protection settings to either increase, or decrease, an extent of functionality of protection commensurately with the risk level, wherein the plurality of protection settings includes a range of protection levels for the respective protective functionality facilitated by the protected data input module, the protected environment module, and the safe data transfer module, wherein at least one of a protected data input level is adjusted among a predetermined range of protected data input levels that differs from the protected data input level set at the initial protection scheme, a protected environment module level is adjusted among a predetermined range of protected environment levels that differs from the protected environment module level set at the initial protection scheme, or a safe data transfer level is adjusted among a predetermined range of safe data transfer levels that differs from the safe data transfer level set at the initial protection scheme, and means for detecting completion of the online financial transaction by determining that all data related to the online financial transaction has been transferred on the network; and means for automatically ending the protection scheme upon detection that the online financial transaction has completed.

* * * * *